United States Patent [19]
Howard et al.

[11] Patent Number: 5,490,075
[45] Date of Patent: Feb. 6, 1996

[54] GLOBAL POSITIONING SYSTEM SYNCHRONIZED ACTIVE LIGHT AUTONOMOUS DOCKING SYSTEM

[75] Inventors: Richard T. Howard; Michael L. Book; Thomas C. Bryan; Joseph L. Bell, all of Huntsville, Ala.

[73] Assignee: The United States of America as represented by the Administrator of the National Aeronautics and Space Administration, Washington, D.C.

[21] Appl. No.: 283,728

[22] Filed: Aug. 1, 1994

[51] Int. Cl.$^6$ .................................................. B64G 1/64
[52] U.S. Cl. ................................. 364/459; 364/424.02
[58] Field of Search ........................... 364/424.02, 459; 356/5; 348/117; 180/167, 168, 169; 244/160, 161

[56] References Cited

U.S. PATENT DOCUMENTS

| | | | |
|---|---|---|---|
| 4,834,531 | 5/1989 | Ward | 356/5 |
| 5,020,876 | 6/1991 | Howard et al. | 350/102 |
| 5,109,345 | 4/1992 | Dabney | 364/459 |
| 5,125,736 | 6/1992 | Vaninetti et al. | 356/5 |
| 5,334,848 | 8/1994 | Grimm | 250/548 |

*Primary Examiner*—Kevin J. Teska
*Assistant Examiner*—Susan Wieland
*Attorney, Agent, or Firm*—Robert L. Broad, Jr.

[57] ABSTRACT

A Global Positioning System Synchronized Active Light Autonomous Docking System (GPSSALADS) for automatically docking a chase vehicle with a target vehicle comprising at least one active light emitting target which is operatively attached to the target vehicle. The target includes a three-dimensional array of concomitantly flashing lights which flash at a controlled common frequency. The GPSSALADS further comprises a visual tracking sensor operatively attached to the chase vehicle for detecting and tracking the target vehicle. Its performance is synchronized with the flash frequency of the lights by a synchronization means which is comprised of first and second internal clocks operatively connected to the active light target and visual tracking sensor, respectively, for providing timing control signals thereto, respectively. The synchronization means further includes first and second Global Positioning System receivers operatively connected to the first and second internal clocks, respectively, for repeatedly providing simultaneous synchronization pulses to the internal clocks, respectively. In addition, the GPSSALADS includes a docking process controller means which is operatively attached to the chase vehicle and is responsive to the visual tracking sensor for producing commands for the guidance and propulsion system of the chase vehicle.

25 Claims, 3 Drawing Sheets

GLOBAL POSITIONING SYSTEM SYNCHRONIZED ACTIVE LIGHT AUTONOMOUS DOCKING SYSTEM

ORIGIN OF THE INVENTION

The invention described herein was made by employees of the United States Government and may be manufactured and used by or for the Government for Government purposes without the payment of any royalties thereon or therefor.

FIELD OF THE INVENTION

The present invention relates to the docking of a mobile vehicle such as a spacecraft, aircraft, boats and land vehicles, and more particularly to an automatic docking system which obviates the need for external assistance or intervention. In even greater particularity, the present invention relates to a new and improved optoelectronic Global Positioning System Synchronized Active Light Autonomous Docking System (GPSSALADS) wherein a target vehicle utilizes an active light target which flashes intermittently and which is synchronized with a visual tracking sensor and image-processing circuitry operatively attached to an approaching chase vehicle by synchronization signals received from a standard Global Positioning System receiver.

BACKGROUND OF THE INVENTION

The development by the National Aeronautics and Space Administration (NASA) of Space Station Freedom has fostered a new impetus toward the development of a completely automated rendezvous and docking system. Many future missions into space will involve rendezvous and docking scenarios that are virtually impossible, risky or uneconomical if ground piloted control of the docking procedure is used because of the long time delays involved. Even operations taking place in Earth orbit are subject to time delays on the order of several seconds.

Initially, the rendezvous or docking of two spacecraft was primarily a manual operation. Such maneuvers were executed by highly trained astronauts, visually acquiring and tracking a target vehicle, while manipulating control mechanisms to fly the chase vehicle during the last roughly 1000 feet of the vehicle trajectory to a desired docking point. Although radar and inertial measurement data were often available to the astronaut so as to provide more accurate information about the spacecraft's position and attitude, the burden was on the astronaut to visually estimate the attitude of the target vehicle relative to his own chase vehicle. Some vehicles included three-axis (roll, pitch and yaw) autopilots to assist in maintaining vehicle attitude. However, these autopilots are incapable of generating the control signals necessary for translation (x, y and z axis) maneuvers.

It will be appreciated by one skilled in the art that using a human astronaut for docking a space vehicle involves a number of disadvantages in addition to those discussed above. For example, there are inherent limitations on the accuracy of an astronaut's estimates with respect to geometrical relations (i.e., angles and distances). Likewise, humans lack the ability to exactly repeat the same control inputs. Therefore, such considerations must be factored into vehicle design as well as mission planning in order to ensure that the required margin of safety is provided resulting necessarily in increased costs and decreased operational flexibility.

To illustrate, docking mechanisms must be overdesigned in order to withstand impacts at high velocities that may occur with astronaut error. In addition, costly time-consuming "pilot-in-the-loop" simulations must be performed to verify the suitability of the information provided to the pilot in both normal and contingency situations.

In response to the inherent limitations and deficiencies of manual docking operations, unmanned docking systems were created. In a limited number of situations, these systems can be successfully accomplished by teleoperations or remote control. Such techniques rely on downlink telemetry of TV images which are monitored by ground control. Guidance commands are then transmitted back to the vehicle on the telemetry uplink. However, systems using communication uplinks usually require a wide bandwidth because both high rate telemetry and video displays are normally needed by ground control which, in turn, tend to be costly and invariably encounter interference problems. Furthermore, the end-to-end time delay introduced by the communications link will degrade the performance of the ground control in docking the chase vehicle, thereby increasing the chances of failure. Therefore, the large number of future docking missions and the vastness of space eliminate the use of teleoperations in many scenarios.

Similarly, although Radio Frequency (RF) technology has long been developed for acquiring and tracking targets for various purposes, the magnitude of RF wavelengths preclude operation at very close ranges and cannot be adapted for the precision measurement requirement required for automated docking. Moreover, RF systems also tend to be plagued with interference problems.

In response to the above deficiencies, various attempts have been made to improve on the unmanned docking of two spacecraft. Interestingly, U.S. Pat. No. 5,109,345 discloses a non-synchronized passive docking system comprising a passive reflector target having three reflective areas thereon affixed to a target vehicle and a tracking sensor attached to a chase vehicle.

The system further comprises a laser diode array mounted on the chase vehicle for illuminating the reflective areas on the passive reflector target which causes light to be reflected therefrom. Substantial eye-safety problems are present if humans occupy the target vehicle. The tracking sensor detects the reflected light and produces electrical output signals in accordance with reflected images thereof.

As noted above with the teleoperated docking systems, this passive reflective docking system possesses many drawbacks. A major disadvantage of this system is that it requires a great expenditure of optical power for an adequate return of illumination from the target. This is particularly true for large targets when there is especially large distances between the chase vehicle and the target. Thus, passive reflective docking systems must illuminate the target with high-powered lasers. When such a system is used with a manned target vehicle (such as Space Station Freedom), human safety is compromised in that the occupants will be at extreme risk of exposure to laser light.

Moreover, the passive reflector areas on the target are frequently subject to bombardment by micrometeorites. There is a very good probability of target damage to a point where their reflectiveness is inadequate. Unfortunately, this damage may not be discovered until a docking maneuver is attempted, which then may prove to be too late.

In addition, the passive reflective system must also expend a great amount of internal processing power to omit data received from a "non-reflecting" target (i.e., noise). In essence, since the system is non-synchronized, it must "subtract" all of the pictures of a "non-lit" target from a picture with the target lit per cycle in order to generate adequate docking commands, otherwise there would be an unacceptably small signal-to-noise ratio. Clearly, a non-synchronized system having a camera operating at 30Hz or more will require substantial internal processing power.

Preliminary work in this field relating to autonomous docking systems includes that described in Tietz, J.C. and Kelly, J.H.: Development of an Autonomous Video Rendezvous and Docking System, Martin Marietta Corporation, Contract No. NAS8-34679, Phase One, (June 1982); Dabney, Richard W.: Automatic Rendezvous and Docking, A Parametric Study, NASA Technical Paper No. 2314, (May 1984); Tietz, J.C. and Richardson, TOE.: Development of an Autonomous Video Rendezvous and Docking System, Martin Marietta Corporation, Contract No. NAS8-34679, Phase Two, (June 1983); and Tietz, J.C.: Development of an Autonomous Video Rendezvous and Docking System, Martin Marietta Corporation, Contract No. NAS8-34679, (Jan. 1984).

While the above-mentioned systems are suited for their intended purpose, none of them disclose a Global Positioning System Synchronized Active Light Autonomous Docking System (GPSSALADS) wherein a target vehicle incorporates an active light target having active illuminators which flash intermittently and which are synchronized with a visual tracking sensor and image-processing circuitry on a chase vehicle by time signals received from a standard Global Positioning System receiver located on both the chase and target vehicles.

Inasmuch as the art is relatively crowded with respect to these various types of passive reflective docking systems, it can be appreciated that there is a continuing need for and interest in improvements to such systems, and in this respect the present invention addresses this need and interest.

SUMMARY OF THE INVENTION

In view of the foregoing disadvantages inherent in the known types of docking systems now present in the art, the present invention provides a new and improved Global Positioning System Synchronized Active Light Autonomous Docking System (hereinafter referred to as "GPSSALADS"). As such, the principal object of the present invention, which will be described subsequently in greater detail, is to provide a new and improved GPSSALADS which has all of the advantages of the prior art and none of the disadvantages.

In support of the principal object, a further object of the present invention is to provide a new and improved GPSSALADS which enables any mobile vehicle to be docked without any outside assistance or intervention, thereby eliminating the need for either manned or teleoperated piloting of the mobile vehicle.

In further support of the principal object, another object of the present invention is to provide a new and improved GPSSALADS which makes it possible for a chase vehicle to be automatically docked with a target vehicle by using active illuminators on the target vehicle which flash simultaneously and are synchronized with a visual tracking sensor and image-processing circuitry on the chase vehicle by use of Global Positioning System time signals (i.e., synchronization pulses).

Another object of the present invention is to provide a new and improved GPSSALADS which dispenses with the need for laser illumination of passive reflectors, such as corner cube reflectors or reflective tape, on the target vehicle.

Still another object of the present invention is to provide a new and improved GPSSALADS which obviates the need for a RF link between the chase and target vehicles, thus eliminating RF interference problems.

It is another object of the present invention to provide a new and improved GPSSALADS that generates more optical signal or signature for a given output power, when compared to passive reflective docking systems, thus reducing the total optical power required for autonomous docking.

It is a further object of the present invention to provide a new and improved GPSSALADS which has a very high signal to noise ratio due to the fact that the system is synchronized by Global Positioning System synchronization pulses which are external time signals accurate to better than 100 microseconds, thus significantly reducing noise.

An even further object of the present invention is to provide a new and improved GPSSALADS which provides for a much larger visible angle of approach by the chase vehicle when compared to the passive reflective docking systems due to the more intense light or optical signal emanating from the active illuminators.

Even still another object of the present invention is to provide a new and improved GPSSALADS which will allow the chase vehicle to begin acquiring and tracking the target vehicle at approximately 1000 meters, which is farther than most passive reflective systems, based on the fact noted above that the target vehicle's active illuminators are much more intense than the reflected light off of passive retroreflectors.

Yet another object of the present invention is to provide a new and improved GPSSALADS that can be used at potentially any place by any mobile vehicle where autonomous rendezvous and docking will be used including but not limited to Space Station Freedom.

Even still a further object of the present invention is to provide a new and improved GPSSALADS which can be tested for proper functioning prior to any attempted autodocking sequence, thus eliminating a problem plaguing passive reflector systems wherein the reflectors are hit by micrometeorites and damaged to where they no longer reflect, the damage not being discovered until a docking maneuver is attempted.

Another object of the present invention is to provide a new and improved GPSSALADS which will provide for a very soft dock between the chase and target vehicles.

An even further object of the present invention is to provide a new and improved GPSSALADS which will use a series of different sized active light targets that flash at different times for preventing lights from one target merging with lights of another target and for improving long range accuracy and for accommodating different fields of view of the chase vehicle.

Yet a further object of the present invention is to provide a new and improved GPSSALADS which will not utilize lasers thus obviating the problems of eye safety when the target vehicle is occupied by humans.

It is a further object of the present invention to provide a new and improved GPSSALADS that utilizes xenon strobe lights and light emitting diodes for its active illuminators.

Even still another object of the present invention is to provide a new and improved GPSSALADS which will utilize the geometry of the target vehicle for its active light target.

These together with other objects of the present invention, along with the various features of novelty which characterize the invention, are accomplished through the use of Global Positioning System Synchronized Active Light Autonomous Docking System (GPSSALADS). The primary purpose of the system is to automatically dock a chase vehicle with a target vehicle. It comprises at least one active light emitting target which is operatively attached to the target vehicle. In a preferred embodiment, the active light target consists of a base plane, a central post extending outwardly from the base plane, a pair of flashing lights or illuminators, which may be xenon strobe lights or light emitting diodes, located on the base plane on opposite sides of the central post, and a third flashing light located at the free end of the central post. The flashing lights concomitantly flash at a controlled common frequency.

The GPSSALADS further comprises a visual tracking sensor operatively attached to the chase vehicle. Generally, the cooperative performance of the visual tracking sensor with the active light target defines a synchronized active light target subsystem. The visual tracking sensor includes a video imaging device, which can be a solid state video camera, and is operatively coupled to an image processing unit. In operation, the concerted action of these two components detect the flashing lights and generate electrical signals corresponding to the computed centroids of the light images. Moreover, the performance of both components are synchronized with the flash frequency of the lights by a synchronization means which will be discussed in greater detail below.

The GPSSALADS further comprises a software processor or signal processing means for processing the electrical signals generated by the image processing unit. It produces its own output signals corresponding to the relative range, roll, pitch, yaw, azimuth and elevation between the chase and target vehicles. This signal processing means may be an inverse perspective processor which performs an inverse perspective algorithm to derive the relative position and attitude between the vehicles.

In addition, the GPSSALADS includes a docking process controller means which is operatively attached to the chase vehicle. It is responsive to the relative position and attitude output signals generated by the signal processing means, and based thereon, produces commands for the guidance and propulsion system of the chase vehicle.

As referred to above, the synchronization means is comprised of a first internal clock operatively connected to the active light target and a second internal clock operatively connected to the visual tracking sensor. The purpose of both clocks is to provide timing control signals to the active light target and the visual tracking sensor, respectively.

The synchronization means further includes a first Global Positioning System receiver operatively connected to the first internal clock and a second Global Positioning System receiver operatively connected to the second internal clock. The receivers continually or repeatedly provide simultaneous synchronization pulses to the internal clocks, respectively, for keeping the clocks accurate and updated.

Since the distance between two vehicles is always changing during the docking thereof, the GPSSALADS may employ a series of active light targets for accommodating and adapting to the different ranges between the vehicles. The targets can be scaled sizes in comparison to one another and their lights will flash at different times (i.e., independently from one another) for eliminating any light merging problems.

There has thus been outlined, rather broadly, the more important features of the invention in order that the detailed description thereof that follows may be better understood, and in order that the present contribution to the art may be better appreciated. There are, of course, numerous other novel features of the present invention that will become apparent from a study of the drawings and the description of the preferred embodiment and which will form the subject matter of the claims appended hereto.

Moreover, it is to be understood that the phraseology and terminology employed herein are for the purpose of description and should not be regarded as limiting. As such, those skilled in the art will appreciate that the conception, upon which this disclosure is based, may readily be utilized as a basis for the designing of other systems for carrying out the several purposes of the present invention. It is important, therefore, that the claims be regarded as including such equivalent systems insofar as they do not depart from the spirit and scope of the present invention.

BRIEF DESCRIPTION OF THE DRAWINGS

The foregoing objects and advantages of the present invention for a new and improved Global Positioning System Synchronized Active Light Autonomous Docking System (GPSSALADS) will be more readily understood by one skilled in the art by referring to the following detailed description of a preferred embodiment and to the accompanying drawings which form a part of this disclosure, and wherein.

DETAILED DESCRIPTION OF THE PREFERRED EMBODIMENTS

Referring to the drawings for a clearer understanding of the present invention, FIG. 1 discloses a Global Positioning System Synchronized Active Light Autonomous Docking System (hereinafter referred to as "GPSSALADS") 11 which contemplates the use of an active light target 12, a visual tracking sensor 13, a docking process controller 14 and thruster hardware 16. The overall purpose of the GPSSALADS 11 is to orchestrate the automatic soft docking of a chase vehicle (not shown) with a target vehicle (not shown) from a range starting at approximately 1000meters.

Figures 1, 2:
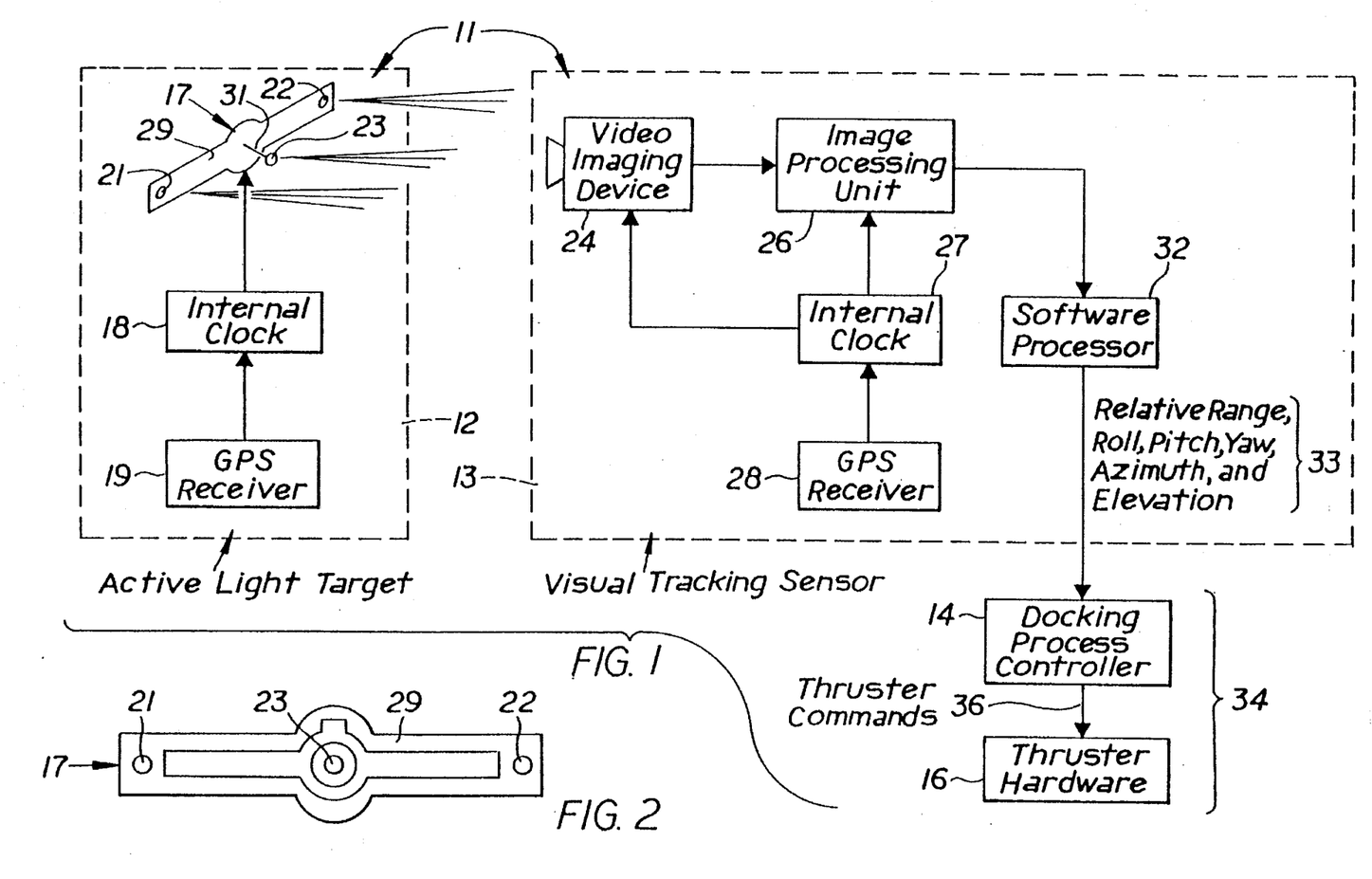
FIG. 1 is a schematic representation, partially in block diagram form, of a preferred embodiment of the Global Positioning System Synchronized Active Light Autonomous Docking System.
FIG. 2 is a front elevational view of an optical docking aid having active illuminators.

The active light target 12, shown in dashed lines in FIG. 1, is operatively attached to the target vehicle whereas the visual tracking sensor 13, also shown in dashed lines in FIG. 1, is operatively attached to the chase vehicle. The concerted performances of the active light target 12 and the visual tracking sensor 13 comprise a novel synchronized active light autonomous target subsystem which is one of the keystone features in the present invention for facilitating the automatic soft docking of the chase vehicle with the target vehicle.

As illustrated in FIGS. 1 and 2, the active light target 12 is comprised of an optical docking aid 17, a docking aid internal clock 18, and a docking aid Global Positioning System (GPS) receiver 19. The optical docking aid 17 includes a light emission or illumination means for emitting light therefrom which is comprised of a plurality of lights or active illuminators 21, 22 and 23 in spaced relation to one another. In a preferred embodiment, the active illuminators 21, 22 and 23 may be either xenon strobe lights or light emitting diodes, depending on the size of the target 12 and range between the chase and target vehicles. Most importantly, the active illuminators 21, 22 and 23 concomitantly flash at a controlled common frequency which is approximately one hertz (1Hz), but may be higher or lower if the situation warrants.

The visual tracking sensor 13 includes a video imaging device 24, which can be any known type of video camera in the art but preferably a thirty hertz (30Hz) solid state video camera. It is operatively coupled or linked to an image processing unit 26 (i.e., computer). In operation, the cooperative actions of the video imaging device 24 and the image processing unit 26 detect and track the flashing active illuminators 21, 22 and 23. This involves the acquisition of frames of video by the video imaging device 24 and the generation of electrical signals by the image processing unit 26 corresponding to the computed centroids of the light images obtained in the frames of video.

The coordinated performances of the video imaging device 24 and the image processing unit 26 are synchronized, thus acting in unison, with the flash frequency of the active illuminators 21, 22 and 23 by a synchronization means operatively and separately attached to both the active light target 12 and the visual tracking sensor 13, respectively.

The synchronization means is comprised of the docking aid internal clock 18 which is operatively connected to the optical docking aid 17 and a tracking sensor internal clock 27 operatively connected to both the image processing unit 26 and the video imaging device 24, respectively. Both clocks 18 and 27 not only maintain a base time reference but act as timing controllers by providing timing control signals to the optical docking aid 17, image processing unit 26 and video imaging device 24, respectively.

Specifically, the docking aid internal clock 18 controls the frequency at which the active illuminators 21, 22 and 23 flash which, as noted above, is preferably one hertz (1Hz). The tracking sensor internal clock 27, on the other hand, controls the frequency at which both the video imaging device 24 and the image processing unit 26 operate. In a preferred embodiment, the video imaging device 24 acquires frames of video at a frequency of thirty hertz (30Hz). The image processing unit 26 operates at two hertz (2Hz) and, therefore, both receives and processes one acquired frame of video at least twice per second. Since the active illuminators 21, 22 and 23, video imaging device 24 and image processing unit 26 are synchronized, one of the frames of video acquired by the image processing unit 26 will be of an "illuminated" docking aid 17 while the other is of a "non-illuminated" docking aid 17.

The general requirement is that when the image processing unit 26 is not receiving a frame of video from the video imaging device 24, it is processing the frame it did receive in order to generate the above mentioned electrical signals corresponding to the centroids of the light images. For reasons discussed later, the internal clock 27 can, if necessary, be used to control one or more active light targets 12.

That is, the GPSSALADS 11 will accommodate and adapt to the concurrent use of a plurality or series of active light targets 12.

Moreover, the GPSSALADS 11 is designed to use significantly less internal processing power when compared to passive or non-synchronized systems. As noted above, every other frame of video received by the image processing unit 26 will be of an "illuminated" docking aid 17, while the other is of a "non-illuminated" docking aid 17. Even though the video imaging device 24 provides thirty (30) frames of video per second to the image processing unit 26, the image processing unit 26, being synchronized with the video imaging device 24 and optical docking aid 17, utilizes (i.e., receives and processes) only two (2) of the thirty (30) frames per second, thus substantially reducing its internal processing power requirement. In direct contrast, non-synchronized systems must process substantially more (i.e., usually all) of the frames of video acquired by the video camera, as opposed to only two frames, to assure that an "illuminated" target is obtained, thus requires significantly more internal processing power than the GPSSALADS 11.

The synchronization means is further comprised of the docking aid Global Positioning System (GPS) receiver 19 operatively connected to the docking aid internal clock 18 and a tracking sensor Global Positioning System (GPS) receiver 28 operatively connected to the tracking sensor internal clock 27. The GPS receivers 19 and 28 continuously provide simultaneous synchronization pulses to the internal clocks 18 and 27, respectively, for updating the clocks and maintaining their accuracy. The frequency of the synchronization pulses is preferably one hertz (1Hz) but may be higher or lower depending on the docking scenario. Moreover, the pulses are accurate to better than 100 microseconds, which is much greater than is required for the present invention.

The optical docking aid 17 may assume a variety of structural configurations. As shown in FIGS. 1 and 2, a preferred embodiment of the optical docking aid 17 is comprised of a base plane 29; a central post 31 extending outwardly from the base plane 29; a pair of first and second active illuminators 21 and 22 attached to the base plane 29 on opposite sides of the central post 31; and a third active illuminator 23 affixed at the free end of the central post 31. The primary purpose of the above optical docking aid 17 configuration is to provide a three-dimensional or non-planar array of active illuminators 21, 22 and 23. As will be discussed below in greater detail, such three-dimensional array is instrumental in allowing the visual tracking sensor 13 to use an inverse perspective algorithm for deriving the relative position and attitude needed for docking. Furthermore, this configuration gives maximum sensitivity for yaw and pitch at zero degrees.

The three active illuminators 21, 22 and 23 are the minimum required for a six-degree-of-freedom relative state determination (i.e., to facilitate derivation of all six error signals that are provided in accordance with the present invention, although a fourth active illuminator, not shown, could be added to provide complete knowledge of the relative vertical orientation, right-side-up versus upside-down). However, this same purpose is served by making active illuminator 22 larger in the illustrated preferred embodiment.

Moreover, the third active illuminator 23 and the central post 33 may be omitted. The only effect will be that the relative pitch and yaw would not be derived.

The range between the chase vehicle and target vehicle along with the angle of approach of the chase vehicle, are factors which influence the size of the optical docking aid 17 and the types active illuminators 21, 22 and 23. Since the autodocking sequence normally begins when the range between the vehicles is at least 1000 meters, a series or plurality of active light targets 12, preferably three (large, medium and small), may be utilized to accommodate the Field of View (FOV) capability of the video imaging device 24 which is known in the art. All three active light targets 12 are operatively attached to the target vehicle.

For a large active light target 12, the distance between the first and second active illuminators 21 and 22, located on the base plane 29, is approximately four meters. The center pole height is approximately twenty centimeters.

For a medium active light target 12, the distance between the first and second active illuminators 21 and 22 is approximately ninety centimeters while the center pole height is approximately twenty centimeters. The distance between the first and second active illuminators 21 and 22 on a small active light target 12 is approximately eight centimeters having a pole height of five centimeters.

When the present invention is utilizing three active light targets 12, the visual tracking sensor 13 begins to acquire and track the large active light target 12 outside 1000 meters. At a close enough range which is determined by the FOV capability of the video imaging device 24, the visual tracking sensor 13 acquires the medium active light target 12. The sensor 13 then tracks both the large and medium active light targets 12 as the chase vehicle closes on the target vehicle. As the range decreases, the large target 12 image becomes too large for the FOV of the video imaging device 24 and becomes unusable. The visual tracking sensor 13 then tracks the medium target 12 while the chase vehicle moves closer to the target vehicle. At a close enough range, the visual tracking sensor 13 acquires the small active light target 12. It then tracks both the medium and small targets 12. Finally, the medium target 12 image becomes too large and is unusable, leaving the small target 12 to guide the chase vehicle to a soft dock. There should be no gaps where one target 12 image becomes too large to be unusable while the next smaller target 12 image is still too small to be tracked by the visual tracking sensor 13. This requirement is accommodated by using the different sized targets 12 as defined above, however, the GPSSALADS 11 may utilize more than three targets 12.

Moreover, the series of active light targets 12 should flash at different times or out of phase so that illuminators from one target 12 never merge with illuminators of another target 12 in a frame of video acquired by the video imaging device 24. Thus, in a preferred embodiment, the frames of video acquired will alternate between the two targets 12, which are then separately processed by the image processing unit 26.

Referring again to FIG. 1, the visual tracking sensor 13 may further comprise a signal processing means for processing the electrical signals generated by the image processing unit 26. It is comprised of a software processor 32 which is operatively linked to the image processing unit 26. In operation, the processor 32 produces its own output signals 33 corresponding to the relative range, roll, pitch, yaw, azimuth and elevation between both the chase and target vehicles. In a preferred embodiment, the software processor 32 may be an inverse-perspective processor which performs a inverse perspective algorithm, which is known in the art, to compute the relative position and attitude of the vehicles.

The output signals 33 corresponding to the relative position and attitude are then supplied to an autonomous docking process controller means 34 for producing angular and translation motion commands for the steering and propulsion system of the chase vehicle. In a preferred embodiment, the docking process controller means 34 is a closed-loop position feed-back control arrangement having six input control channels corresponding to the relative position and attitude set out above, and is operatively attached to the software processor 32 on the chase vehicle.

Figure 3:
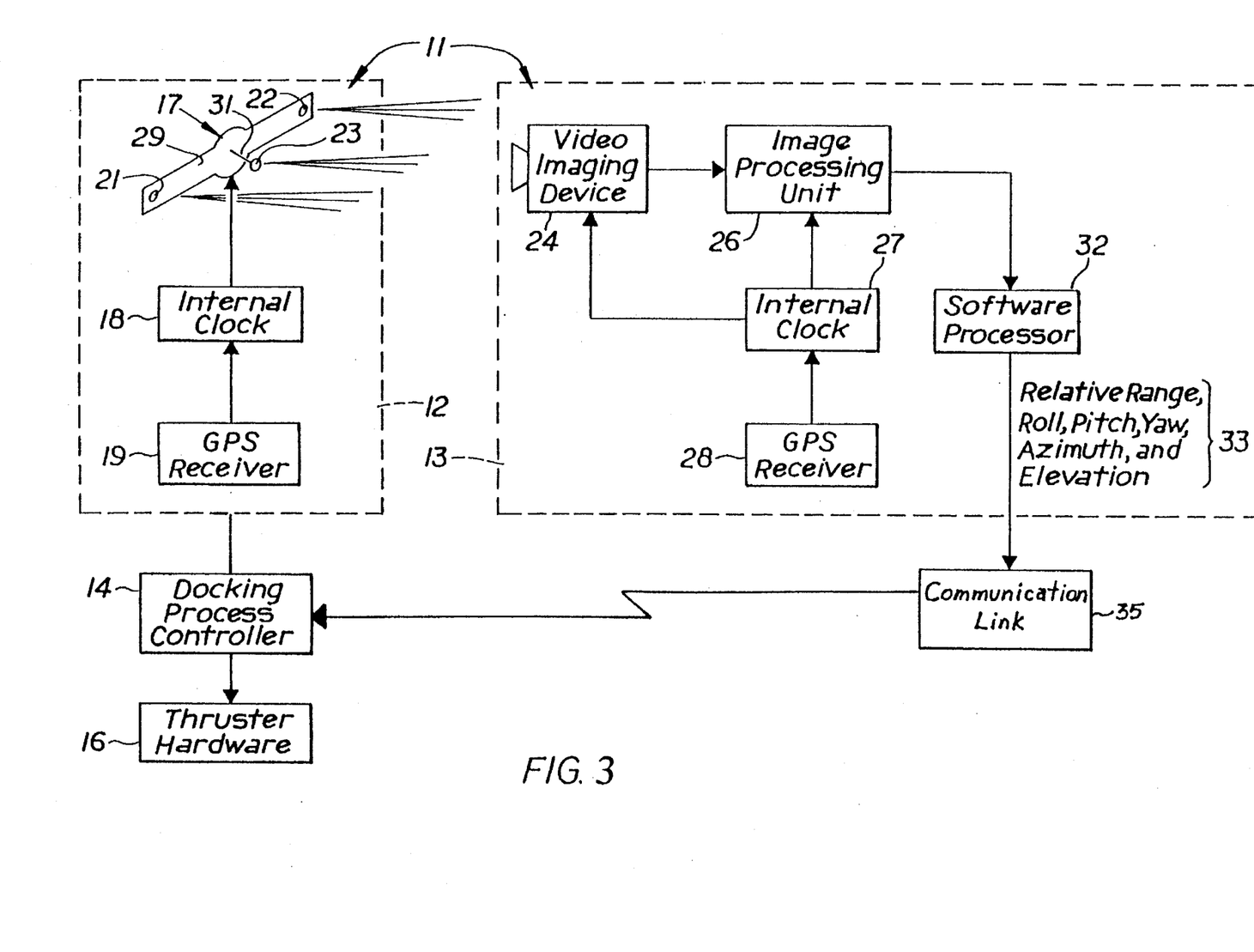
FIG. 3 is a schematic representation, partially in block diagram form, of an alternative embodiment of the Global Positioning System Synchronized Active Light Autonomous Docking System.

In an alternative embodiment, as illustrated in FIG. 3, the active light target 12 may be operatively attached to the chase vehicle whereas the visual tracking sensor 13 is operatively attached to the target vehicle. The output signals 33 generated by the software processor 32 corresponding to the relative position and attitude between the vehicles occurs on the target vehicle, therefore must be transmitted or communicated to the docking process controller means 34, or more specifically to the docking process controller 14 via a communication link 35, which is located on the chase vehicle, by RF signals or optical signals.

In all embodiments, the docking process controller means 34 is comprised of the docking process controller 14 And thruster hardware 16. The docking process controller 1 provides a sequence of operations to generate motion or thruster commands 36 for the chase vehicle's propulsion system or thruster hardware 16. It should be noted, however, that the docking process controller 14 and thruster hardware 16 may assume a variety of configurations which are well known in the art and are not germane to the present invention so long as they are responsive to the software processor 32 and capable of producing commands for the guidance and propulsion system of the chase vehicle. In this regard, while the controller 14 described above is the simplest known that is capable of performing the task assigned, it is to be considered representative of more sophisticated embodiments. Therefore, further discussion of the controller 14 is omitted in the interest of clarity.

Figure 4:
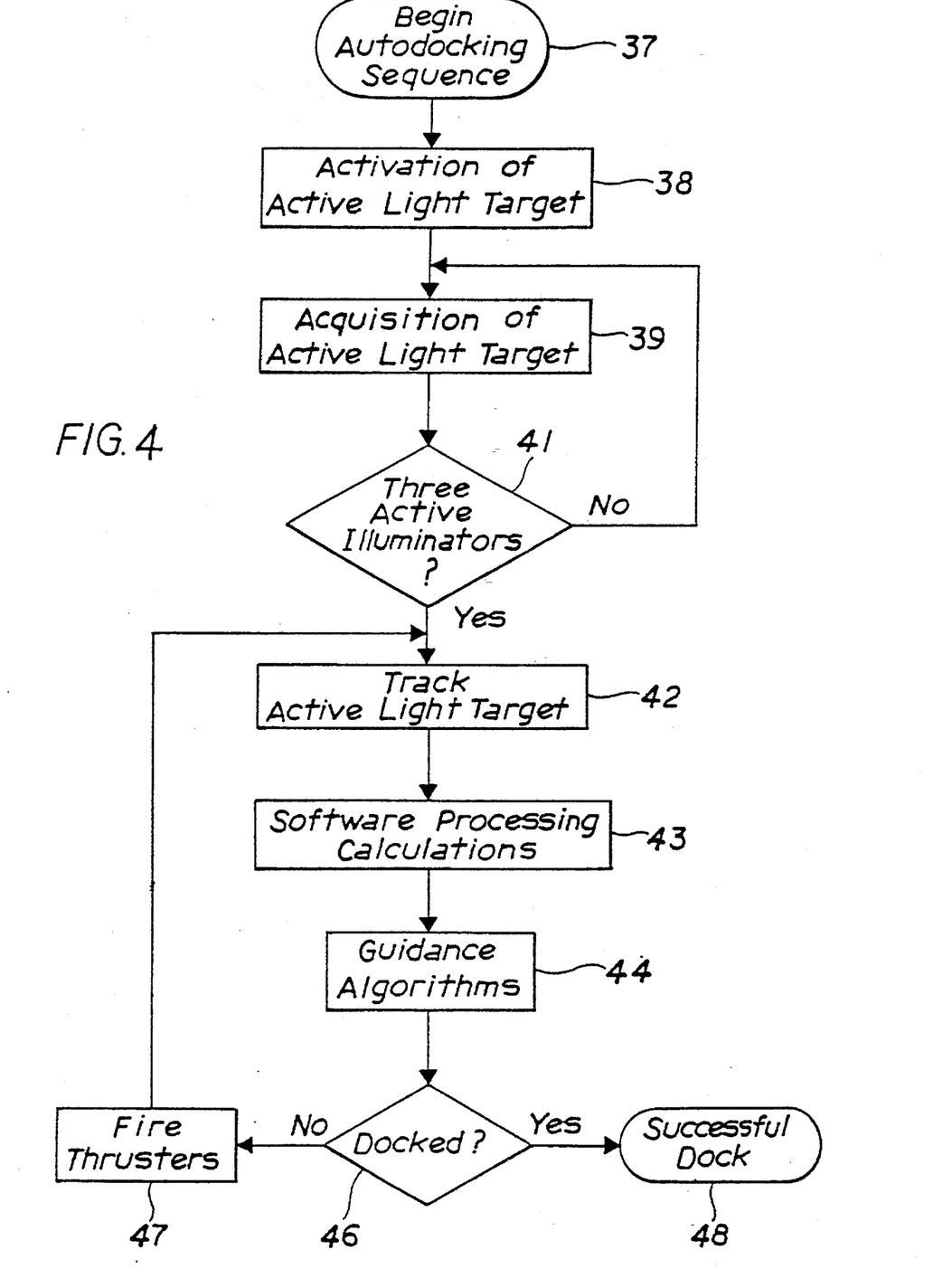
FIG. 4 is a flow chart of the overall autodocking sequence using the GPSSALADS of FIG. 1.

Referring to FIG. 4, a flow diagram is illustrated showing the basic steps for automatically docking the chase vehicle with the target vehicle having one active light target 12. This flow diagram may be modified slightly to accommodate the simultaneous tracking of a series of active light targets 12, as referred to above, and the embodiment shown in FIG. 3.

Terminal block 37 represents the beginning of the autodocking sequence, which initially involves the activation of the target vehicle's active light target 12, as represented by processing block 38. Activation may occur through the use of an on-board timer, a radio signal, an optical signal, or an on-board astronaut. Once it occurs, however, the active illuminators 21, 22 and 23, which are attached to the optical docking aid 17 on the active light target 12, begin concomitant flashing at a frequency determined by the timing control signals received from the docking aid internal clock 18. The internal clock 18 is updated approximately once per second by the synchronization pulses received from the docking aid Global Positioning System receiver 19 to prevent substantially all drifting of the internal clock 18.

Next, the chase vehicle's visual tracking sensor 13 begins acquisition of the active light target 12, as represented by processing block 39. The tracking sensor 13 becomes active in response to the timing control signals received from tracking sensor internal clock 27. As with the docking aid internal clock 18, the tracking sensor internal clock 27 is updated approximately once per second by the synchronization pulses received from the tracking sensor Global Positioning System receiver 28, which are ubiquitous or simultaneous as those from the GPS receiver 19. As with the active light target 12, such synchronization or updating prevents substantially all drifting of the internal clock 27.

In addition, acquisition of the active light target 12 by the visual tracking sensor 13 involves a determination by the image processing unit 26 as to whether one of the two frames of video acquired by the video imaging device 24 include three "light images" corresponding to the flashing active illuminators 21, 22 and 23, as represented by decision diamond 41. As indicated by decision diamond 41, if a determination is made that the "light images" corresponding to the active illuminators 21, 22 and 23 are not present in a frame of video, the acquisition operation continues until they are present. When present, the processing operations by the image processing unit 26 are initiated including full tracking of the active light target 12, as represented by processing block 42. The processing of the "light images" comprises computing the centroids of the active illuminators 21, 22 and 23, and producing electrical signals corresponding thereto.

The next step in the autodocking sequence is the performance of calculations by the software processor 32, as indicated by processing block 43. The software processor 32 processes the electrical signals generated by the image processing unit 26 and produces its own output signals corresponding to the relative ranges roll, pitch, yaw, azimuth and elevation between both vehicles. This is accomplished by an inverse-perspective projection technique. An explanation and basic equations needed for these calculations are set forth in the Teitz and Kelly reference referred to above.

Next, based on the six output signals generated by the software processor 32, the docking process controller 14 produces commands for the guidance and propulsion system of the chase vehicle, as represented by processing block 44. The actual docking procedure is then executed which involves the firing of the thruster hardware 16 based on the chase vehicle commands derived from the guidance and propulsion algorithms.

In this regard, as indicated by decision diamond 46, the docking procedure is terminated at this point if the vehicle commands do not provide for firing of the thruster hardware 16, as represented by processing block 47, if there has been a successful dock. In other words, if the vehicle is determined to be docked, the procedure is terminated, as represented by terminal block 48. On the other hand, if the docking has not been completed, the thruster hardware 16 are fired and the basic procedure beginning with tracking of the optical docking aid 17 is repeated, as illustrated.

While the present invention is shown in one form, it would be obvious to those skilled in the art that it is not so limited but is susceptible of various changes and modifications without departing from the spirit thereof.

Having set forth the nature of the present invention, what is claimed is:

1. A synchronized target subsystem for use in automated docking systems wherein a chase vehicle is docked with a target vehicle, said synchronized target subsystem comprising:

(a) an active target operatively attached to said target vehicle, said target comprising an optical docking aid having light emission means mounted thereon for radiating light therefrom;

(b) a tracking sensor operatively attached to said chase vehicle for acquiring and tracking said active target throughout the docking of said chase vehicle with said target vehicle; and (c) synchronization means operatively connected to both said active target and said tracking sensor for synchronizing said optical docking aid with said tracking sensor.

2. A synchronized target subsystem as defined in claim 1 wherein said synchronization means comprises:

(a) a first internal clock operatively connected to said optical docking aid;

(b) a second internal clock operatively connected to said tracking sensor wherein said first and second internal clocks provide timing control signals to said optical docking aid and said tracking sensor, respectively;

(c) a first Global Positioning System receiver operatively connected to said first internal clock; and (d) a second Global Positioning System receiver operatively connected to said second internal clock wherein said first and second receivers provide concomitant synchronization pulses to said first and second clocks, respectively, for updating said clocks.

3. A synchronized target subsystem as defined in claim 2 wherein said light emission means comprises a plurality of active illuminators in spaced relation to one another.

4. A synchronized target subsystem as defined in claim 3 wherein said active illuminators concomitantly flash in response to said timing control signals received from said first internal clock.

5. A synchronized target subsystem as defined in claim 4 wherein said tracking sensor comprises a video imaging device operatively coupled to an image processing unit for detecting said concomitant flashing of said active illuminators and for generating electrical output signals corresponding to the computed centroids of said active illuminators, said video imaging device and said image processing unit both operatively connected to said second internal clock and responsive to said timing control signals received therefrom.

6. A synchronized target subsystem as defined in claim 4 wherein said plurality of active illuminators comprise a first and second active illuminator being located in a base plane, and at least a third active illuminator being spaced from said base plane so as to provide a three-dimensional array of active illuminators.

7. A synchronized target subsystem as defined in claim 4 wherein said optical docking aid comprises:

(a) a base plane;

(b) a central post extending outwardly from said base plane;

(c) first and second active illuminators located on said base plane on opposite sides of said central post; and (d) a third active illuminator located at the end of said central post.

8. A synchronized target subsystem as defined in claim 5 wherein said tracking sensor further comprises signal processing means for processing said electrical output signals from said image processing unit and for producing, based thereon, output signals corresponding to the relative range, roll, pitch, yaw, azimuth and elevation of said chase vehicle and said target vehicle.

9. A synchronized target subsystem as defined in claim 8 wherein said signal processing means comprises an inverse perspective processor.

10. A synchronized target subsystem as defined in claim 9 wherein said active target is operatively attached to said chase vehicle and said tracking sensor is operatively attached to said target vehicle.

11. A synchronized autonomous docking system for docking a chase vehicle with a target vehicle, said docking system comprising:

(a) an active optical target operatively attached to said target vehicle, said target having illumination means mounted thereon for emitting light therefrom;

(b) a visual tracking sensor operatively attached to said chase vehicle for acquiring and tracking said target throughout the docking of said chase vehicle with said target vehicle, said active optical target and said visual tracking sensor operating in concert with one another; and (c) docking process controller operatively attached to said chase vehicle and responsive to said visual tracking sensor, for producing commands for the propulsion system of said chase vehicle.

12. A synchronized autonomous docking system as defined in claim 11 wherein said active optical target comprises:

(a) an optical docking aid including a plurality of active illuminators for radiating light therefrom wherein a first and second active illuminator are positioned in a base plane and a third active illuminator is spaced from said base plane so as to provide a three-dimensional array of active illuminators;

(b) a docking aid internal clock operatively connected to said optical docking aid for providing timing control signals thereto; and (c) a docking aid Global Positioning System receiver operatively connected to said docking aid internal clock for updating and providing synchronization pulses thereto.

13. A synchronized autonomous docking system as defined in claim 12 wherein said visual tracking sensor comprises:

(a) a video imaging device;

(b) an image processing unit operatively coupled to said video imaging device;

(c) a tracking sensor internal clock operatively connected to both said image processing unit and said video imaging device for providing timing control signals thereto, respectively; and (d) a tracking sensor Global Positioning System receiver operatively connected to said tracking sensor clock for updating and providing synchronization pulses thereto, wherein said pulses from said tracking sensor Global Positioning System receiver are synchronous with said pulses from said docking aid Global Positioning System receiver.

14. A synchronized autonomous docking system as defined in claim 13 wherein said active illuminators concomitantly flash at a frequency established by said timing control signals received from said docking aid internal clock.

15. A synchronized autonomous docking system as defined in claim 14 wherein said video imaging device and image processing unit detect said concomitant flashing of said active illuminators and produce electrical output signals corresponding to the computed centroids thereof, said video imaging device and said image processing unit both responsive to said timing control signals received from said tracking sensor internal clock.

16. A synchronized autonomous docking system as defined in claim 15 wherein said visual tracking sensor further comprises signal processing means for processing said electrical output signals and for producing, based thereon, output signals corresponding to the relative range, roll, pitch, yaw, azimuth and elevation between said chase vehicle and said target vehicle.

17. A synchronized autonomous docking system as defined in claim 16 wherein said signal processing means comprises an inverse perspective processor.

18. A synchronized autonomous docking system as defined in claim 17 wherein said active optical target is operatively attached to said chase vehicle and said visual tracking sensor is operatively attached to said target vehicle, said docking process controller responsive to RF signals received from said inverse perspective processor via a communication link corresponding to said output signals.

19. A synchronized autonomous docking system as defined in claim 12 wherein said active optical docking aid comprises:

(a) said base plane;

(b) a central post extending outwardly from said base plane;

(c) said first and second active illuminators located on said base plane on opposite sides of said central post; and (d) said third active illuminator located at the end of said central post.

20. A synchronized autonomous docking system as defined in claim 19 wherein said docking system comprises a plurality of active optical targets flashing at different times for accommodating varying distances between said chase and target vehicles.

21. A synchronized active light docking system for automatically docking a chase vehicle with a target vehicle, said system comprising:

(a) at least one active light emitting target operatively attached to said target vehicle, said target comprising a base plane, a central post extending outwardly from said base plane, first and second flashing lights located on said base plane on opposite sides of said central post, a third flashing light located at the free end of said central post, said flashing lights concomitantly flashing at a common frequency;

(b) a visual tracking sensor operatively attached to said chase vehicle, said tracking sensor comprising a video camera operatively coupled to an image processing unit for detecting said flashing lights and for producing electrical output signals corresponding to the computed centroids thereof, respectively;

(c) synchronization means operatively connected to both said active light emitting target and said visual tracking sensor for synchronizing said video camera and said image processing unit with said common frequency of said flashing lights;

(d) signal processing means operatively connected to said image processing unit for processing said electrical output signals received therefrom and for producing, based thereon, output signals corresponding to the relative range, roll, pitch, yaw, azimuth and elevation between said chase vehicle and said target vehicle; and (e) docking process controller operatively attached to said chase vehicle and responsive to said output signals received from said signal processing means for producing commands for the thruster hardware of said chase vehicle.

22. A synchronized active light docking system as defined in claim 21 wherein said synchronization means comprises a first internal clock operatively connected to said active light emitting target and a second internal clock operatively connected to both said visual tracking sensor and said video camera wherein said clocks provide timing control signals to said target, said tracking sensor and said video camera, respectively.

23. A synchronized active light docking system as defined in claim 22 wherein said synchronization means further comprises a first Global Positioning System receiver operatively connected to said first internal clock and a second Global Positioning System receiver operatively connected to said second internal clock, each of said receivers providing simultaneous synchronization pulses to said clocks, respectively, for updating said clocks.

24. A synchronized active light docking system as defined ill claim 23 wherein said docking system employs a series of active light emitting targets having different flash frequencies for accommodating different ranges between said chase and target vehicles.

25. A synchronized active light docking system as defined in claim 23 wherein said active light emitting target is operatively attached to said chase vehicle and said visual tracking sensor is operatively attached to said target vehicle, said docking process controller responsive to optical signals received from said signal processing means via a communication link corresponding to said output signals.

* * * * *